(12) United States Patent
Dellock et al.

(10) Patent No.: US 11,465,570 B2
(45) Date of Patent: Oct. 11, 2022

(54) EXTRUSION GRADE PERLITE REINFORCED POLYPROPYLENE POLYMER

(71) Applicant: Ford Global Technologies, LLC, Dearborn, MI (US)

(72) Inventors: Paul Kenneth Dellock, Northville, MI (US); Stuart C. Salter, White Lake, MI (US); Richard Gall, Pinckney, MI (US); David Brian Glickman, Southfield, MI (US); Michael A. Musleh, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 338 days.

(21) Appl. No.: 16/809,765

(22) Filed: Mar. 5, 2020

(65) Prior Publication Data
US 2020/0198555 A1    Jun. 25, 2020

Related U.S. Application Data

(62) Division of application No. 15/592,564, filed on May 11, 2017, now Pat. No. 10,632,936.

(51) Int. Cl.
*B60R 13/08*    (2006.01)
*C08L 51/06*    (2006.01)
(Continued)

(52) U.S. Cl.
CPC ........ *B60R 13/0815* (2013.01); *B29C 43/003* (2013.01); *B29C 43/14* (2013.01);
(Continued)

(58) Field of Classification Search
CPC ... B29C 43/003; B29C 43/14; B60R 13/0815; B60R 13/0861; C08J 9/0066; C08J 9/009; C08K 7/28; C08K 9/06; C08L 51/06
See application file for complete search history.

(56) References Cited

U.S. PATENT DOCUMENTS

| | | | |
|---|---|---|---|
| 8,950,548 | B2 | 2/2015 | Schneider et al. |
| 9,657,166 | B2 | 5/2017 | Van Riel et al. |

(Continued)

FOREIGN PATENT DOCUMENTS

| | | |
|---|---|---|
| CN | 1288203 C | 12/2006 |
| CN | 104293294 A | 1/2015 |

(Continued)

OTHER PUBLICATIONS

Mattausch, H. et al., Fundamental investigations of reinforcement of expanded perlite in polypropylene (Abstract), New Developments in Polymer Composites Research, Jan. 2013.
(Continued)

*Primary Examiner* — Jeremy A Luks
(74) *Attorney, Agent, or Firm* — Vichit Chea; Price Heneveld LLP

(57) ABSTRACT

The invention disclosed herein is an automotive acoustic panel including a porous sound-absorption material made from a polymer and an expanded perlite. One or more silane compounds may be coupled or coated onto the expanded perlite while a coupling agent and a chemical foaming agent may additionally be added to the automotive acoustic panel.

20 Claims, 8 Drawing Sheets

(51) Int. Cl.
    *C08J 9/00*     (2006.01)
    *B29C 43/00*     (2006.01)
    *B29C 43/14*     (2006.01)
    *B29C 51/00*     (2006.01)
    *B29C 43/48*     (2006.01)
    *B29C 43/22*     (2006.01)
    *B29C 51/02*     (2006.01)
    *B29K 83/00*     (2006.01)
    *B29K 509/08*     (2006.01)
    *B29K 105/16*     (2006.01)
    *B29L 7/00*     (2006.01)
    *B29L 31/30*     (2006.01)
    *B29K 105/00*     (2006.01)
    *B29K 25/00*     (2006.01)
    *B29C 44/26*     (2006.01)
    *B29K 27/06*     (2006.01)
    *B29K 69/00*     (2006.01)
    *B29C 43/02*     (2006.01)
    *B29K 23/00*     (2006.01)
    *B29K 77/00*     (2006.01)
    *B29C 44/30*     (2006.01)
    *B29K 33/04*     (2006.01)
    *C08J 9/08*     (2006.01)
    *B29C 51/10*     (2006.01)
    *B29C 51/16*     (2006.01)
    *B29K 105/04*     (2006.01)

(52) U.S. Cl.
    CPC ............ *B29C 43/48* (2013.01); *B29C 51/002* (2013.01); *B60R 13/0861* (2013.01); *C08J 9/009* (2013.01); *C08J 9/0066* (2013.01); *C08L 51/06* (2013.01); *B29C 43/02* (2013.01); *B29C 43/22* (2013.01); *B29C 44/26* (2013.01); *B29C 44/30* (2013.01); *B29C 51/02* (2013.01); *B29C 51/10* (2013.01); *B29C 51/16* (2013.01); *B29C 2043/144* (2013.01); *B29C 2043/483* (2013.01); *B29K 2023/06* (2013.01); *B29K 2023/12* (2013.01); *B29K 2025/06* (2013.01); *B29K 2027/06* (2013.01); *B29K 2033/04* (2013.01); *B29K 2069/00* (2013.01); *B29K 2077/00* (2013.01); *B29K 2083/00* (2013.01); *B29K 2105/0005* (2013.01); *B29K 2105/0026* (2013.01); *B29K 2105/0032* (2013.01); *B29K 2105/0085* (2013.01); *B29K 2105/04* (2013.01); *B29K 2105/16* (2013.01); *B29K 2105/251* (2013.01); *B29K 2509/08* (2013.01); *B29K 2995/0002* (2013.01); *B29K 2995/0063* (2013.01); *B29L 2007/002* (2013.01); *B29L 2031/30* (2013.01); *C08J 9/08* (2013.01); *C08J 2201/026* (2013.01); *C08J 2203/02* (2013.01); *C08J 2207/00* (2013.01); *C08J 2323/04* (2013.01); *C08J 2323/12* (2013.01); *C08J 2325/06* (2013.01); *C08J 2327/06* (2013.01); *C08J 2367/00* (2013.01); *C08J 2369/00* (2013.01); *C08J 2371/02* (2013.01); *C08J 2377/00* (2013.01); *C08J 2381/04* (2013.01)

(56) References Cited

U.S. PATENT DOCUMENTS

| | | |
|---|---|---|
| 10,030,126 B2 | 7/2018 | Kumar et al. |
| 2003/0060113 A1 | 3/2003 | Christie et al. |
| 2005/0281999 A1 | 12/2005 | Hofmann et al. |
| 2010/0066121 A1* | 3/2010 | Gross .................. G10K 11/162 442/364 |
| 2012/0034441 A1 | 2/2012 | Adzima et al. |
| 2014/0141676 A1 | 5/2014 | Crandall et al. |
| 2016/0186395 A1 | 6/2016 | Zhang et al. |
| 2019/0144627 A1 | 5/2019 | Treat |

FOREIGN PATENT DOCUMENTS

| | | |
|---|---|---|
| CN | 104611930 A | 5/2015 |
| CN | 103964749 B | 9/2015 |
| KR | 20110002289 A | 1/2011 |

OTHER PUBLICATIONS

Mattausch, H. et al. , Influence of processing conditions on the morphology of expanded perlite/polypropylene composites (Abstract), AIP Conference Proceedings, Feb. 2015, vol. 1593, Issue 1.

* cited by examiner

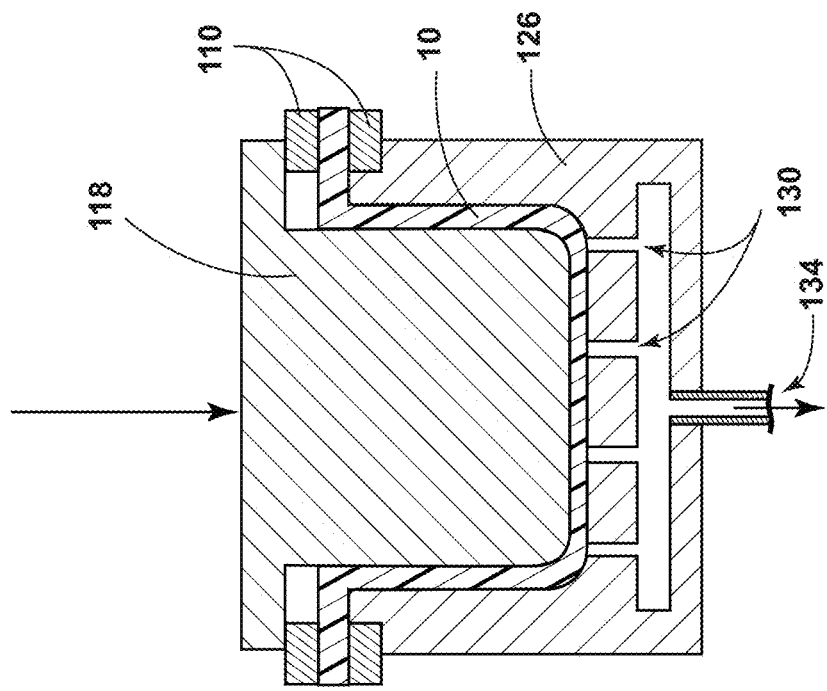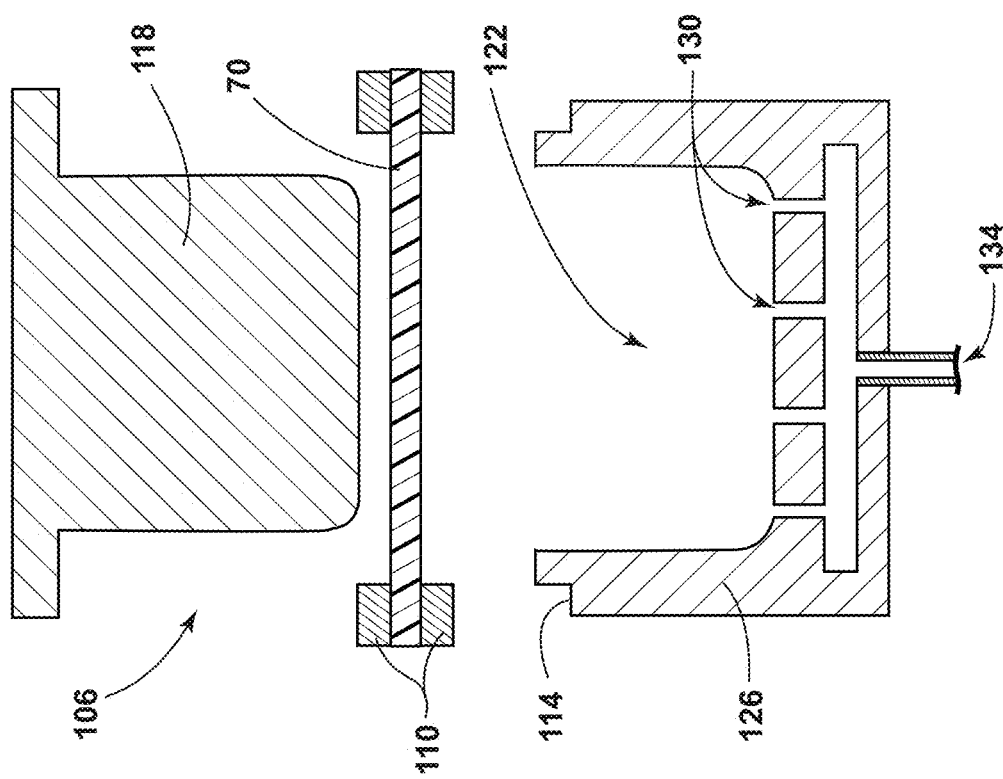
FIG. 7A
FIG. 7B

| | | Talc | Copolymer Polypropylene | Color Masterbatch | Expanded Perlite | Maleic anhydride grafted polypropylene | Foaming Agent | Air | Total | | |
|---|---|---|---|---|---|---|---|---|---|---|---|
| Base formula – 20% by wt Talc filled Polypropylene | % wt | 21% | 78% | 1.23% | 0 | | | | | Elongation at Yield | 8.8% |
| | % vol | 8.50% | 90.30% | 1.20% | 0 | | | | 100.0% | Tensile Modulus | 1.723 GPa |
| | Density gm/cc | 2.64 | 0.905 | 1.1 | 0 | | | | 100% | Flex Modulus | 1.75 GPa |
| | gm in a cc | 0.224 | 0.817 | 0.013 | | | | | 1.054 | Izod Impact | 0.59 j/cm |
| Targeted Formula (1) | | | | | | | | | | | |
| Formula 1 Expanded Perlite, Co-Polymer Polypropylene | % wt | 0% | 93% | 1.55% | 4% | 1% | | | 100% | Elongation at Yield | 7.5% |
| | % vol | 0% | 87.8% | 1.20% | 10% | 1% | | | 100% | Tensile Modulus | 1.65 GPa |
| Formula 1 10% by volume 4% by wt. Expanded Perlite | Density gm/cc | 2.64 | 0.905 | 1.1 | 0.35 | 0.95 | | | | Flex Modulus | 1.62 GPa |
| | gm in a cc | 0 | 0.79459 | 0.0132 | 0.035 | 0.0095 | | | 0.85229 | Izod Impact | .61 j/cm |
| Alternate – Higher Stiffness Formula (2) | | | | | | | | | | | |
| Expanded Perlite, Co-Polymer Polypropylene | % wt | 0% | 88% | 2% | 9% | 1% | | | 100% | Elongation at Yield | 5.5% |
| | % vol | 0% | 77.8% | 1.20% | 20% | 1% | | | 100% | Tensile Modulus | 2.23 GPa |
| Formula 2 20% by vol 9% by wt. Expanded Perlite | Density gm/cc | 2.64 | 0.905 | 1.1 | 0.35 | 0.95 | | | | Flex Modulus | 2.1 GPa |
| | gm in a cc | 0 | 0.70409 | 0.0132 | 0.07 | 0.0095 | | | 0.79679 | Izod Impact | .71 j/cm |
| Alternate – Low Density Formula (3) | | | | | | | | | | | |
| Expanded Perlite, Foam filled Co-Polymer Polypropylene | % wt | 0% | 83% | 1.83% | 10% | 4% | 2% | | 100% | Elongation at Yield | 2.5% |
| | % vol | 0% | 66% | 1.20% | 20% | 3% | 1% | 7% | 100% | Tensile Modulus | 1.95 GPa |
| Formula 3 10% Expanded Perlite, 2% foaming agent by wt. | Density gm/cc | 2.64 | 0.905 | 1.1 | 0.35 | 0.95 | 1.1 | 0 | | Flex Modulus | 1.9 GPa |
| | gm in a cc | 0 | 0.5973 | 0.0132 | 0.07 | 0.0285 | 0.011 | | 0.72 | Izod Impact | .51 j/cm |
| Alternate – Low Density Formula (4) | | | | | | | | | | | |
| Expanded Perlite, Foam filled Co-Polymer Polypropylene | % wt | 0% | 80% | 1.77% | 14% | 4% | | | 100% | Elongation at Yield | 2.0% |
| | % vol | 0% | 66% | 1.20% | 30% | 3% | | | 100% | Tensile Modulus | 1.96 GPa |
| Formula 4 30% by vol 14% wt Expanded Perlite | Density gm/cc | 2.64 | 0.905 | 1.1 | 0.35 | 0.95 | | | | Flex Modulus | 2.5 GPa |
| | gm in a cc | 0 | 0.5973 | 0.0132 | 0.105 | 0.0285 | | | 0.74 | Izod Impact | .41 j/cm |

FIG. 9 ions intended to cover the invention disclosed herein, which, as a matter of language, might be said to fall therebetween.

EXTRUSION GRADE PERLITE REINFORCED POLYPROPYLENE POLYMER

CROSS-REFERENCE TO RELATED APPLICATION

The present application is a divisional of U.S. patent application Ser. No. 15/592,564 filed May 11, 2017, entitled EXTRUSION GRADE PERLITE REINFORCED POLYPROPYLENE POLYMER, the entire disclosure of which is hereby incorporated herein by reference.

FIELD OF THE INVENTION

The present invention generally relates to automotive paneling having improved noise, vibration, and harshness (NVH) properties, and more specifically, polymer composites reinforced with perlite used to make paneling.

BACKGROUND OF THE INVENTION

As fuel economy standards are being increased, reducing the weight of a vehicle while improving aerodynamics are key priorities for the automotive industry. To help improve aerodynamics, underbody shields are being added to the underside of vehicles. Although shielding can improve the aerodynamics, these underbody shields have the negative impact of adding weight to the vehicle. Many different approaches have been used to reduce the weight of paneling and underbody shields on vehicles. For example, many manufacturers use covers and shields made from low cost polymers such as polypropylene and high density polyethylene. To help improve the stiffness and heat resistance of these polymers, material fillers such as glass and talc are frequently added. These material blends have been chosen since they are affordable and use traditional components. These materials however, lack the properties of sound attenuation and heat deflection required in vehicles.

Another approach used by manufacturers to reduce the weight while addressing the NVH and aerodynamic requirements required by original equipment manufacturers (OEMs), has been to switch to shields made from nonwoven fabrics combined with PET (polyethylene teraphthalate) or polypropylene polymers. Although these materials are lightweight and effective at reducing sound attenuation, they are expensive costing two to three times as much as standard polymer shields.

Accordingly, there is a need to develop low cost materials, designs, and processing methods to produce products that are both lightweight and feature improved NVH properties.

SUMMARY OF THE INVENTION

According to one aspect of the present invention, an automotive acoustic panel is provided. The automotive acoustic panel includes a porous sound-absorption material including a polymer and an expanded perlite, one or more silane compounds coated on the expanded perlite, a coupling agent, and a chemical foaming agent.

According to another aspect of the present invention, a method of forming an acoustic panel. The method includes providing an expanded perlite treated with one or more silane compounds, providing a polymer having a chemical foaming agent, combining the polymer and the expanded perlite to form a porous sound-absorption material, pressing the porous sound-absorption material using a double belt press to form an acoustic panel, and thermoforming the acoustic panel using a vacuum and/or a mechanical mold to form the acoustic panel.

According to another aspect of the present invention, a method of forming an automotive acoustic panel is provided. The method includes providing an expanded perlite treated with one or more silane compounds and a coupling agent, providing a polymer having a chemical foaming agent, combining the polymer and the expanded perlite to form a porous sound-absorption material, pressing the porous sound-absorption material using a double belt press to form an acoustic panel, thermoforming the acoustic panel to form the automotive acoustic panel.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 7A is a partially schematic cross-sectional view of a mechanical mold having a heated perlite composition positioned over a mechanical mold cavity according to some embodiments of the present disclosure;

FIG. 7B is a partially schematic cross-sectional view of a mechanical mold with a plug forming an automotive acoustic panel according to some embodiments of the present disclosure;

FIG. 9 is a table providing data for a variety of sound-absorption materials according to some embodiments of the present invention.

DETAILED DESCRIPTION OF THE PREFERRED EMBODIMENTS

Figure 1:
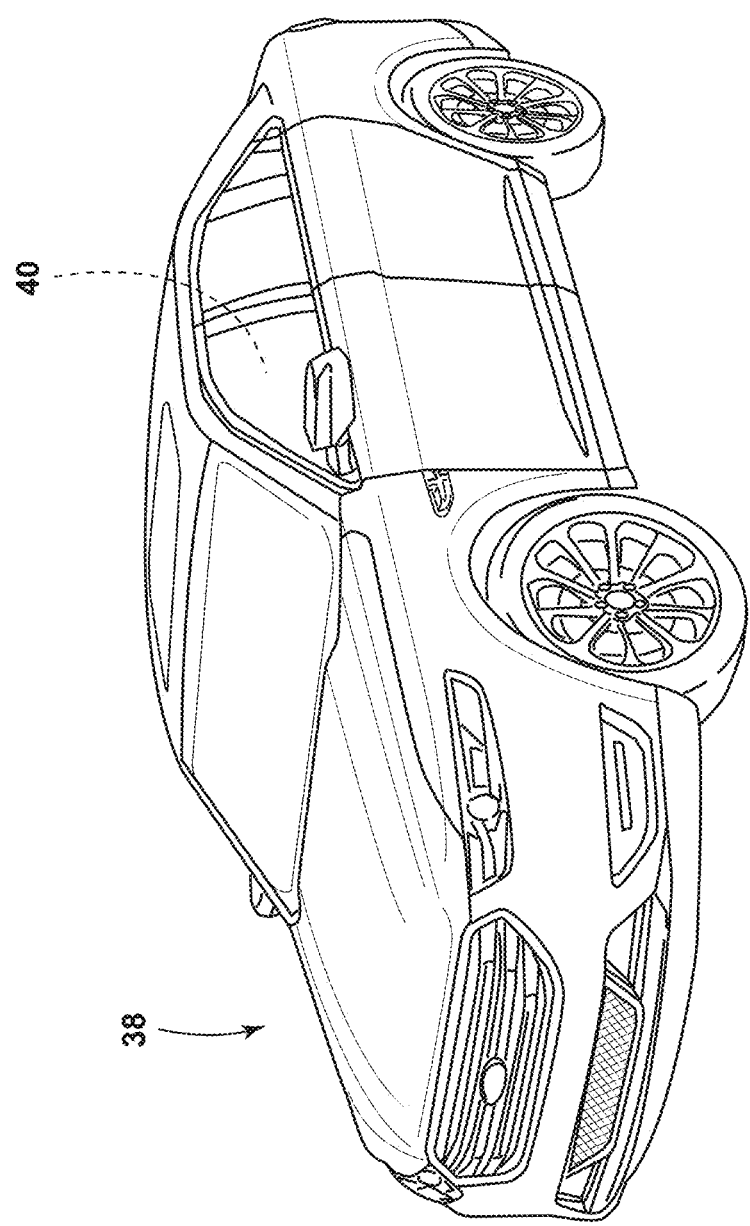
FIG. 1 is a front perspective view of an automotive vehicle having an acoustic panel according to some embodiments of the present disclosure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-7, reference numeral 10 generally designates an automotive acoustic panel for use in an automotive vehicle 38. The automotive acoustic panel 10 includes a porous sound-absorption material 14 made from a polymer 18 and an expanded perlite 22. One or more silane compounds 26 may be coupled or coated onto the expanded perlite 22 while a coupling agent 30 and a chemical foaming agent 34 may additionally be added to the automotive acoustic panel 10.

To enhance the impact properties and processability of the automotive acoustic panel 10, the polymer 18 may be a polyolefin elastomer. In some embodiments, the polyolefin elastomer can be an ethylene octene copolymer, an ethylene hexene copolymer, an ethylene propylene copolymer, an ethylene butene copolymer, an ethylene pentene copolymer, or a combination thereof can each be used as the polymer 18. In some embodiments, the polymer 18 is the ethylene octene copolymer or ethylene butene copolymer. In some embodiments, the polymer includes polyethylene-co-propylene, polyethylene (including HDPE, LDPE and/or LLDPE) and polypropylene, polyester, polyamide, PVC, nylons, polystyrene, polyphenylene sulfide, polyoxymethylene and polycarbonate, and combinations thereof.

The expanded perlite 22 may be a perlite derived and expanded from a perlite ore. Perlite belongs to the class of natural glasses, commonly referred to as volcanic glasses, which are formed by the rapid cooling of siliceous magma and lava. Perlite ore is a hydrated natural glass containing typically about 72-75% $SiO_2$, 12-14% $Al_2O_3$, 0.5-2% $Fe_2O_3$, 3-5% $Na_2O$, 4-5% $K_2O$, 0.4-1.5% CaO (by weight) and small concentrations of MgO, $TiO_2$ and other metallic elements. Expanded perlite 22 and perlite ore are distinguished from other natural glasses by a higher content (2-10% by weight) of chemically bonded water, the presence of a vitreous, pearly luster, and characteristic concentric or arcuate onion skin-like (i.e., perlitic) fractures.

In some embodiments, the expanded perlite 22 can be milled to a fine powder having a diameter less than 1 mm. The non-expanded milled expanded perlite 22 can have a very fine particle size, high blue light brightness, and low oil absorption, thereby permitting much greater utility, particularly as anti-block filler products. In some embodiments, the expanded perlite 22 has a diameter of less than about 0.1 mm. In other embodiments, the expanded perlite 22 has a density from about 0.25 $g/cm^3$ to about 0.40 $g/cm^3$.

The expanded perlite 22 can be coupled to or coated/treated with one or more silane compounds 26. The silane compounds 26 used can be applied either as a concentrated silane or a diluted solution of silane in water and/or alcohol. In some embodiments, the expanded perlite 22 can be coated uniformly on its surface through the use of mixing, such as with a Henschel mixer.

The silane treatment of the expanded perlite 22 can offer several advantages. First, adhesion can be improved between the expanded perlite 22 and the polymer 18. Second, the silane compounds 26 can improve the wet-out of the expanded perlite 22 by the polymer 18. Third, the silane compounds 26 can improve the dispersion of the expanded perlite 22 in the polymer 18. Lastly, the silane compounds 26 can reduce the viscosity of the polymer 18/expanded perlite 22 mix.

In some embodiments, the one or more silane compounds 26 may include polydimethyl siloxane, polymethylphenyl siloxane, di-hydroxy terminated polydimethyl siloxanes, dialkoxy terminated polydimethyl siloxanes, N-(2-aminoethyl)-3-aminopropyltrimethoxysilane, 3-methacryloxypropyltrimethoxysilane, 3-glycidoxypropyltrimethoxysilane, 3-chloropropyltrimethyoxysilane, trimethoxysilyl ethyl amine, triethoxysilyl ethyl amine, tripropoxysilyl ethyl amine, tributoxysilyl ethyl amine, trimethoxysilyl propyl amine, triethoxysilyl propyl amine, tripropoxysilyl propyl amine, triisopropoxysilyl propyl amine, tributoxysilyl propyl amine, trimethoxysilyl butyl amine, triethoxysilyl butyl amine, tripropoxysilyl butyl amine, tributoxysilyl butyl amine, trimethoxysilyl pentyl amine, triethoxysilyl pentyl amine, tripropoxysilyl pentyl amine, tributoxysilyl pentyl amine, trimethoxysilyl hexyl amine, triethoxysilyl hexyl amine, tripropoxysilyl hexyl amine, tributoxysilyl hexyl amine, trimethoxysilyl heptyl amine, triethoxysilyl heptyl amine, tripropoxysilyl heptyl amine, tributoxysilyl heptyl amine, trimethoxysilyl octyl amine, triethoxysilyl octyl amine, tripropoxysilyl octyl amine, tributoxysilyl octyl amine, or combinations thereof.

The coupling agent 30 can help improve the mixing and/or adhesion of the polymer 18 with expanded perlite 22 to form the porous sound-absorption material 14. In some embodiments, an example coupling agent may include maleic anhydride grafted polypropylene (MAPP) (tradename Eastman G-3003). The MAPP is coupled to enhance the bond between the expanded perlite 22 (with or without silane coating) and the polymer 18. The amount of the coupling agent 30 that can be added or coupled to the polymer 18 can be varied from 0 to about 5.0 wt % of the automotive acoustic panel 10. In some embodiments, the coupling agent 30 is about 0.1% to about 5.0% by weight of the automotive acoustic panel. In some embodiments, the amount of the coupling agent 30 can be about 1 wt % and was chosen since minimal property improvement is achieved at greater loadings. In some embodiments, the coupling agent 30 includes maleic anhydride grafted polypropylene.

To further reduce the density of the automotive acoustic panel 10, the chemical foaming agent 34 may be added to the polymer 18 and expanded perlite 22 mixture. The added chemical foaming agent 34 may further reduce the density when the chemical foaming agent 34 decomposes producing either carbon dioxide and/or nitrogen gasses. The byproduct carbon dioxide and/or nitrogen gasses liberated from the decomposition of the chemical foaming agent 34 result in a sheet with a fine, uniform cellular structure that can help capture noise thus improving the noise attenuation of the automotive acoustic panel 10. The chemical foaming agent 34 can significantly reduce the density of the automotive acoustic panel 10 when a 0% to 20% by weight chemical foaming agent 34 is used. In some embodiments, the chemical foaming agent 34 has a weight percent no more than 8 wt %.

In some embodiments, the chemical foaming agent 34 includes sodium carbonate, sodium hydrogen carbonate, magnesium carbonate, magnesium hydrogen carbonate, calcium carbonate, calcium hydrogen carbonate, aluminum carbonate, aluminum hydrogen carbonate, iron carbonate, iron hydrogen carbonate, ammonium carbonate, ammonium hydrogen carbonate, ammonium carbamate and mixtures thereof. In some embodiments, the chemical foaming agent 34 is about 0.1% to about 20% by weight of the automotive acoustic panel.

Other optional additives that may be used with the porous sound-absorption material 14 include materials that can enhance color, retard fire, or improve the UV stability of the resultant automotive acoustic panel 10. One potential additive includes coloring concentrates. Since most automotive acoustic panels 10 will be black, carbon black may be added to the composition. Other colors may be added as desired based on the application and final use. Color concentrates that are compatible with polyethylene, polypropylene, or the polymer 18 will be used. Depending on the required level of flame resistance required for the automotive acoustic panel 10, a flame retardant can be added to the porous sound-absorption material 14. In some embodiments, the flame retardant can be a brominated flame retardant or a chlorinated retardant. In other embodiments, non-halogenated materials can also be used as flame retardant such as phosphorus or metal oxide based compounds depending on the application. If UV stability is required for the automotive acoustic panel 10, a UV light stabilizer can be used as an additive where the UV light stabilizer can be a hindered amine, benzophenone, benzotriazole, or combinations thereof that can be added to the porous sound-absorption material 14. In some embodiments, the automotive acoustic panel 10 further includes a coloring agent, a flame retardants, a UV light stabilizer, or combinations thereof.

Referring to FIG. 1, a wheeled automotive vehicle 38 having one or more automotive acoustic panels 10 (not shown) coupled to the bottom of the vehicle 38 is provided. The vehicle 38 is shown as a car although the type of vehicle 38 is not meant to be limiting and the vehicle 38 could additionally be, for example, a minivan, truck, commercial vehicle, or any other wheeled motorized vehicle. The vehicle 38 additionally has a passenger compartment 40 for passengers.

Figure 2:
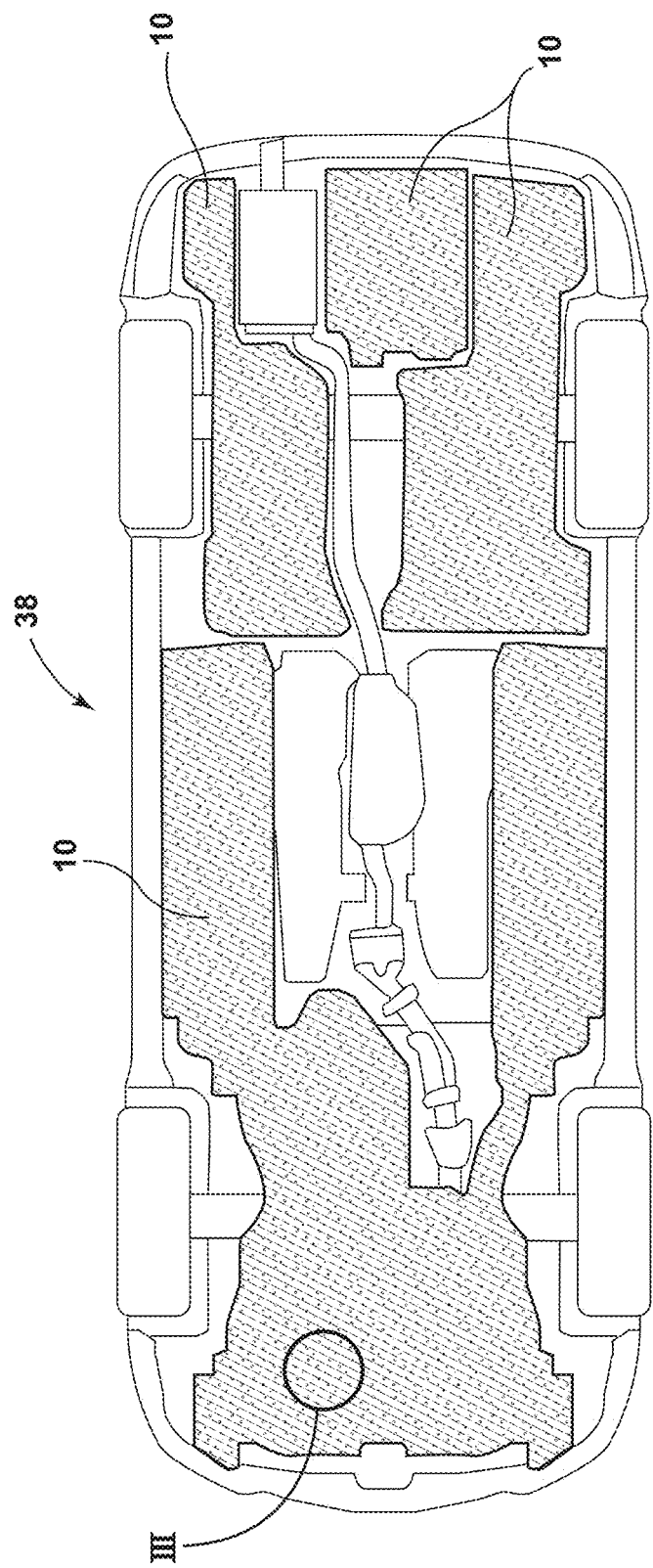
FIG. 2 is a bottom view of the vehicle of FIG. 1.

Referring now to FIG. 2, the bottom of the vehicle 38 is shown having one or more automotive acoustic panels 10. The automotive acoustic panel 10 can be positioned across the bottom of the vehicle 38 to minimize exposed area of the vehicle 38 to the outside environment and maximize the NVH reduction of sound going into the passenger compartment.

Figure 3:
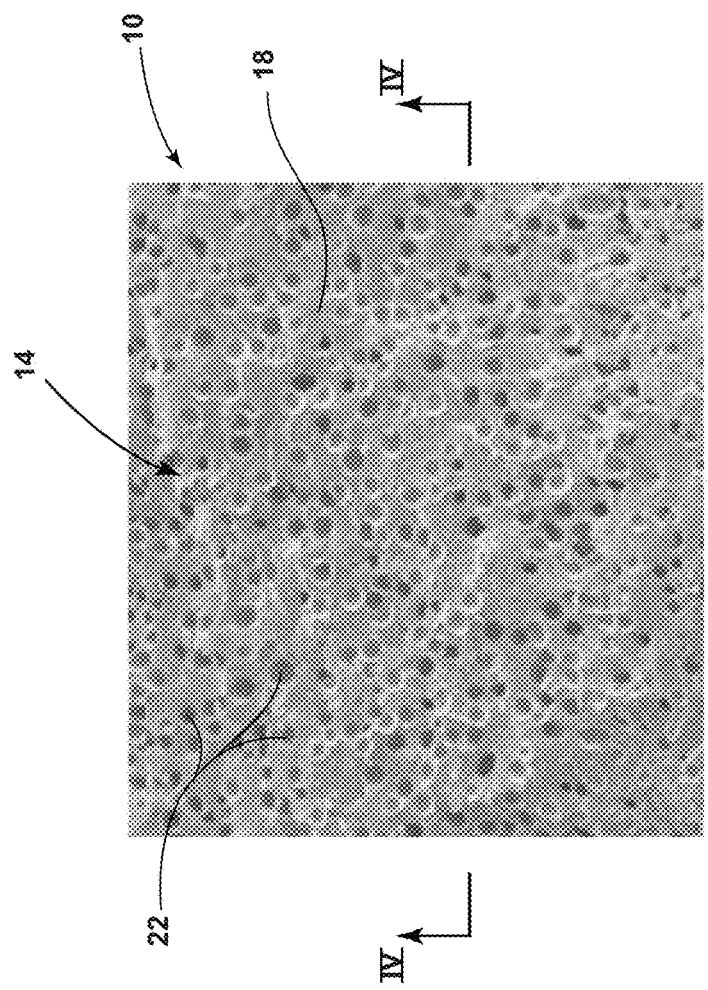
FIG. 3 is an expanded view of the automotive acoustic panel of FIG. 2 taken from the portion III according to some embodiments of the present disclosure.

Referring now to FIG. 3, an expanded view of the automotive acoustic panel 10 of FIG. 2 taken from the portion III is provided. The surface of the automotive acoustic panel 10 shows the polymer 18 and expanded perlite 22 mixed together to form the porous sound-absorption material 14.

Figure 4:
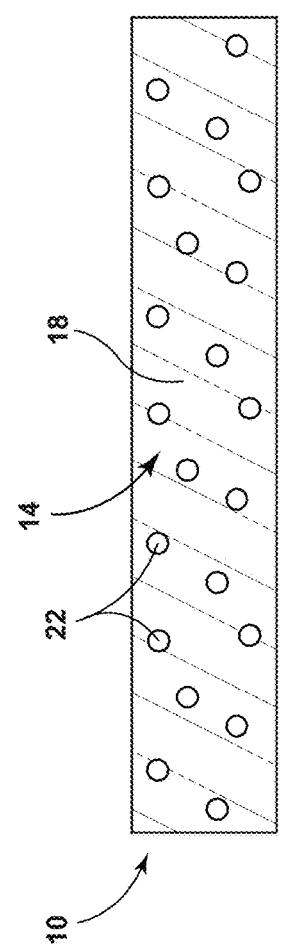
FIG. 4 is a cross-sectional view of the automotive acoustic panel of FIG. 3 taken along the line IV-IV.

Referring now to FIG. 4, a cross-sectional view of the automotive acoustic panel 10 represented in FIG. 3 is shown taken along the line IV-IV. The cross-sectional view of the automotive acoustic panel 10 shows the dispersion of the expanded perlite 22 disposed in the polymer 18 across the porous sound-absorption material 14.

Figure 5:
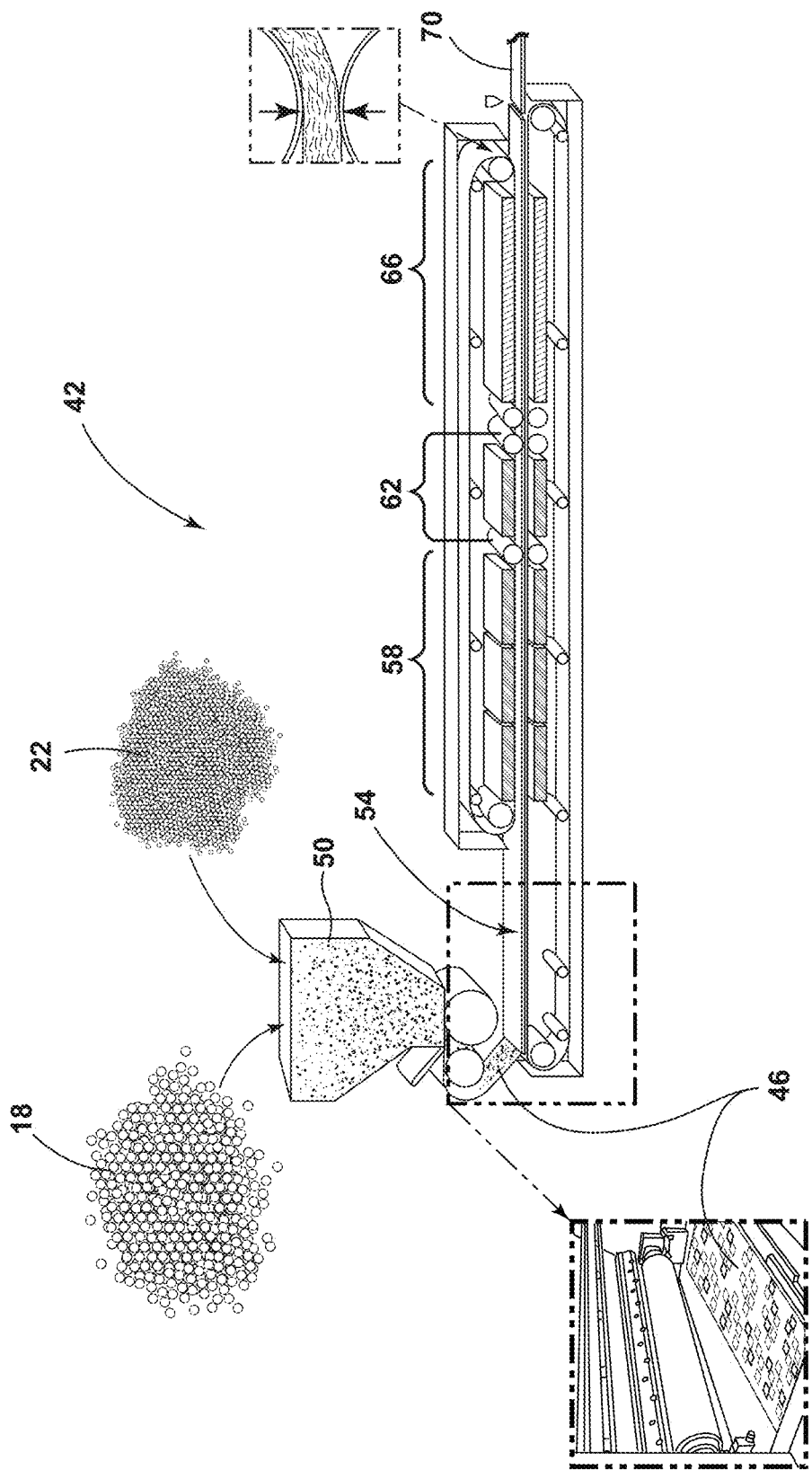
FIG. 5 is a partially schematic cross-sectional view of a double belt press according to some embodiments of the present disclosure.

Referring now to FIG. 5, a double belt press 42 is shown for pressing and/or laminating the polymer 18 and the expanded perlite 22 into a perlite composite sheet 70. The double belt press 42 includes two thermally reinforced stable TEFLON® and glass coated belts that are arranged horizontally one on top of the other. After thoroughly mixing the polymer 18 pellets and expanded perlite 22 to form a perlite polymer mixture 46, the materials are evenly spread in a single layer across the entire width of an extended lower belt 54 by a scattering unit or an addition member 50 that continuously mixes and disperses a single layer of the polymer 18 and expanded perlite 22. The back sides of the lower 54 and upper belts are in contact with heating and cooling platens. While the lower platens are mounted rigidly, the upper platens are able to move in a vertical direction together with the entire upper belt in order to create a gap according to the required thickness of the perlite composite sheet 70. One or more pairs of calibrating nip rolls 62 are mounted after a heating zone 58 and are used to tune the thickness of the molded perlite composite sheet 70. The perlite composite sheet 70 is next conveyed to an annealing zone 66 where the material is cooled to a desired temperature. The perlite composite sheet 70 can then be cut to a desired length of spooled onto a roll. The resulting double belt press 42 process is competitive with other sheet extrusion methods. The maximum pressure that is applied to the perlite composite sheet 70 and this double belt press 42 process is less than 200 psi.

Figure 6A:
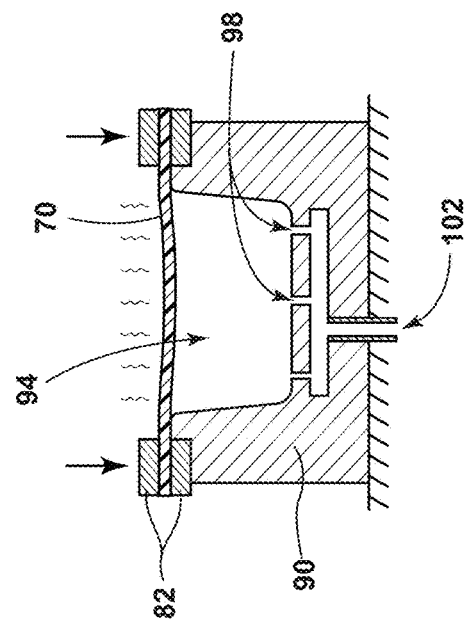
FIG. 6A is a partially schematic cross-sectional view of a vacuum mold heating a perlite composition according to some embodiments of the present disclosure.
Figure 6B:
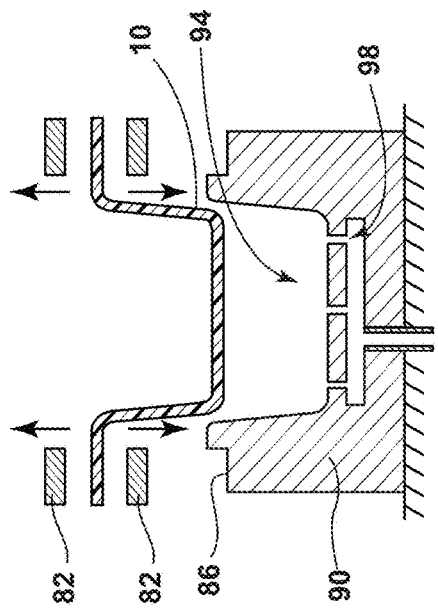
FIG. 6B is a partially schematic cross-sectional view of a vacuum mold positioning the heated perlite composition over the vacuum cavity according to some embodiments of the present disclosure.
Figure 6C:
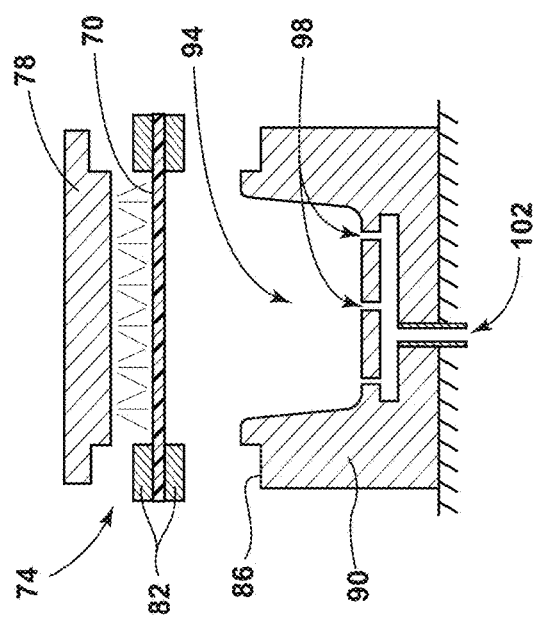
FIG. 6C is a partially schematic cross-sectional view of a vacuum mold applying a vacuum to the heated perlite composition according to some embodiments of the present disclosure.
Figure 6D:
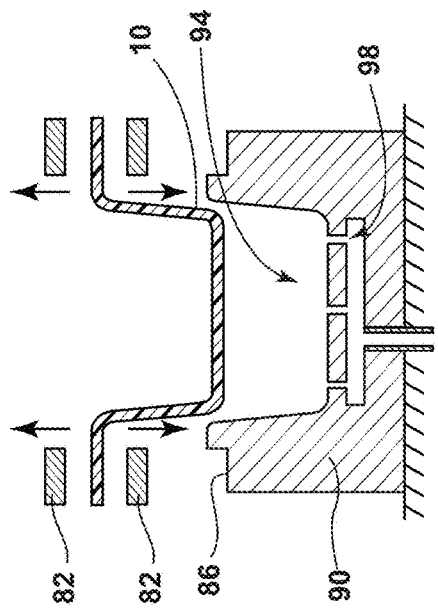
FIG. 6D is a partially schematic cross-sectional view of a vacuum mold removing the automotive acoustic panel according to some embodiments of the present disclosure.
Figure 8:
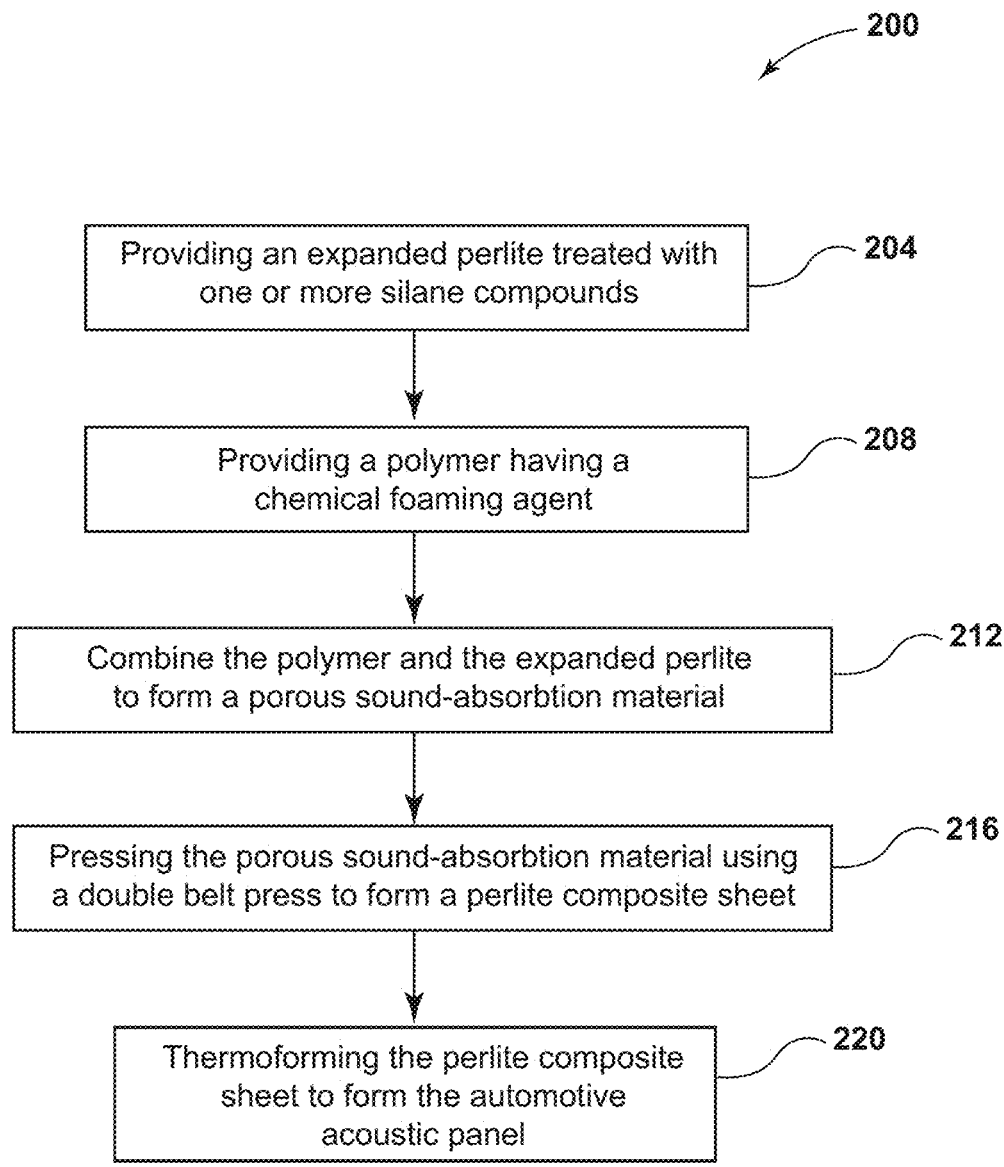
FIG. 8 is a flow diagram of a method for forming an automotive acoustic panel according to some embodiments of the present disclosure.

Referring now to FIGS. 6A-6D, a vacuum thermoform 74 is shown fabricating the automotive acoustic panel 10. As shown in FIG. 6A, the vacuum thermoform 74 includes a radiant heater 78 and a clamping member 82 to hold and position the perlite composite sheet 70. The clamping member 82 can be lowered with the perlite composite sheet 70 into a receiving member 86 of a vacuum mold 90 where the heated perlite composite sheet 70 is sucked or drawn down into a vacuum mold cavity 94 where the vacuum is applied through one or more vacuum holes 98 and a vacuum draw 102. As shown in FIG. 6B, the vacuum is applied to the heated perlite composite sheet 70 and the softened perlite composite sheet 70 is drawn down into the vacuum mold cavity 94 as shown in FIG. 6C. As shown in FIG. 6D, once cooled, the formed automotive acoustic panel 10 is removed from the vacuum mold cavity 94 of the vacuum mold 90 and the automotive acoustic panel 10 is removed from the clamping member 82.

Referring now to FIG. 7A-7B, a mechanical thermoform 106 is shown fabricating the automotive acoustic panel 10. As shown in FIG. 7A, the mechanical thermoform 106 includes a clamping member 110 that positions and couples to the perlite composite sheet 70 and where the clamping member 110 can then be positioned on a receiving member 114. As shown in FIG. 7B, the mechanical thermoform 106 then uses a plug 118 to mechanically deform the heated perlite composite sheet 70 into the mechanical mold cavity 122 of the mechanical mold 126. As the heated perlite composite sheet 70 is formed into the mechanical mold cavity 122, air is removed from the mechanical mold cavity 122 via vent holes 130 and a vent port 134. After the perlite composite sheet 70 is molded into the desired shape of the mechanical mold 126, the perlite composite sheet 70 is cooled and the desired automotive acoustic panel 10 is removed from the mechanical thermoform 106.

Referring now to FIGS. 1-8, the method 300 of forming the automotive acoustic panel 10 includes providing the expanded perlite 22 treated with one or more silane compounds 26 (step 204) and providing the polymer 18 having the chemical foaming agent (step 208). The method also includes combining the polymer 18 and the expanded perlite 22 to form the porous sound-absorption material 14 (step 212). The method further includes pressing the porous sound-absorption material 14 using the double belt press 42 to form the perlite composite sheet 70 (step 216). Lastly, the method further includes thermoforming the perlite composite sheet 70 to form the automotive acoustic panel 10 (step 220).

Referring now to FIG. 9, the comparative example base formula includes the composition used for a 20 wt % talc filled polypropylene sample and its corresponding material properties defining the elongation at yield, tensile modulus, flex modulus, and Izod impact values. Additionally included in FIG. 9 is a disclosed: Targeted Formula (1); Alternate Higher Stiffness Formula (2); Alternate Low Density Formula (3); and a second Alternate Low Density Formula (4). The elongation at yield, tensile modulus, flex modulus, and Izod impact values are additionally provided for the inventive Targeted Formula (1); Alternate Higher Stiffness Formula (2); Alternate Low Density Formula (3); and second Alternate Low Density Formula (4).

It is understood that the descriptions outlining and teaching the automotive acoustic panel 10 previously discussed, which can be used in any combination, apply equally well to the second embodiment, where applicable, further disclosing a method of forming the automotive acoustic panel 10.

It will be understood by one having ordinary skill in the art that construction of the described device and other components may not be limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

LISTING OF NON-LIMITING EMBODIMENTS

Embodiment A is an automotive acoustic panel comprising: a porous sound-absorption material comprising a polymer and an expanded perlite; one or more silane compounds coated on the expanded perlite; a coupling agent; and a chemical foaming agent.

The automotive acoustic panel of Embodiment A wherein the polymer comprises polyethylene-co-propylene, polyethylene, polypropylene, polyester, polyamide, PVC, nylons, polystyrene, polyphenylene sulfide, polyoxymethylene and polycarbonate, and combinations thereof.

The automotive acoustic panel of Embodiment A or Embodiment A with any of the intervening features wherein the expanded perlite has a density from about 0.25 g/cm$^3$ to about 0.40 g/cm$^3$.

The automotive acoustic panel of Embodiment A or Embodiment A with any of the intervening features wherein the expanded perlite has a diameter of less than about 0.1 mm.

The automotive acoustic panel of Embodiment A or Embodiment A with any of the intervening features wherein the one or more silane compounds comprise polydimethyl siloxane, polymethylphenyl siloxane, di-hydroxy terminated polydimethyl siloxanes, dialkoxy terminated polydimethyl siloxanes, N-(2-aminoethyl)-3-aminopropyltrimethoxysilane, 3-methacryloxypropyltrimethoxysilane, 3-glycidoxypropyltrimethoxysilane, 3-chloropropyltrimethyoxysilane, trimethoxysilyl ethyl amine, triethoxysilyl ethyl amine, tripropoxysilyl ethyl amine, tributoxysilyl ethyl amine, trimethoxysilyl propyl amine, triethoxysilyl propyl amine, tripropoxysilyl propyl amine, triisopropoxysilyl propyl amine, tributoxysilyl propyl amine, trimethoxysilyl butyl amine, triethoxysilyl butyl amine, tripropoxysilyl butyl amine, tributoxysilyl butyl amine, trimethoxysilyl pentyl amine, triethoxysilyl pentyl amine, tripropoxysilyl pentyl amine, tributoxysilyl pentyl amine, trimethoxysilyl hexyl amine, triethoxysilyl hexyl amine, tripropoxysilyl hexyl amine, tributoxysilyl hexyl amine, trimethoxysilyl heptyl amine, triethoxysilyl heptyl amine, tripropoxysilyl heptyl amine, tributoxysilyl heptyl amine, trimethoxysilyl octyl amine, triethoxysilyl octyl amine, tripropoxysilyl octyl amine, tributoxysilyl octyl amine, or combinations thereof.

The automotive acoustic panel of Embodiment A or Embodiment A with any of the intervening features wherein the coupling agent comprises maleic anhydride grafted polypropylene.

The automotive acoustic panel of Embodiment A or Embodiment A with any of the intervening features wherein the coupling agent is about 0.1% to about 5.0% by weight of the automotive acoustic panel.

The automotive acoustic panel of Embodiment A or Embodiment A with any of the intervening features wherein the chemical foaming agent comprises sodium carbonate, sodium hydrogen carbonate, magnesium carbonate, magnesium hydrogen carbonate, calcium carbonate, calcium hydrogen carbonate, aluminum carbonate, aluminum hydrogen carbonate, iron carbonate, iron hydrogen carbonate, ammonium carbonate, ammonium hydrogen carbonate, ammonium carbamate, or combinations thereof.

The automotive acoustic panel of Embodiment A or Embodiment A with any of the intervening features wherein the chemical foaming agent is about 0.1% to about 20% by weight of the automotive acoustic panel.

The automotive acoustic panel of Embodiment A or Embodiment A with any of the intervening features further comprising a coloring agent, a flame retardant, a UV light stabilizer, or combinations thereof.

Embodiment B is a method of forming an acoustic panel, the method comprising: providing an expanded perlite treated with one or more silane compounds; providing a polymer having a chemical foaming agent; combining the polymer and the expanded perlite to form a porous sound-absorption material; pressing the porous sound-absorption material using a double belt press to form a perlite composite sheet; and thermoforming the perlite composite sheet using a vacuum and/or a mechanical mold to form the acoustic panel.

The method of Embodiment B further comprising: contacting a coupling agent to the expanded perlite treated with the one or more silane compounds.

The method of Embodiment B or Embodiment B with any of the intervening features wherein the polymer comprises polyethylene-co-propylene, polyethylene, polypropylene, polyester, polyamide, PVC, nylons, polystyrene, polyphenylene sulfide, polyoxymethylene and polycarbonate, and combinations thereof.

The method of Embodiment B or Embodiment B with any of the intervening features wherein the expanded perlite has a density from about 0.25 g/cm$^3$ to about 0.40 g/cm$^3$ and the expanded perlite has a diameter of less than about 0.1 mm.

The method of Embodiment B or Embodiment B with any of the intervening features wherein the one or more silane compounds comprise polydimethyl siloxane, polymethylphenyl siloxane, di-hydroxy terminated polydimethyl siloxanes, dialkoxy terminated polydimethyl siloxanes, N-(2-aminoethyl)-3-aminopropyltrimethoxysilane, 3-methacryloxypropyltrimethoxysilane, 3-glycidoxypropyltrimethoxysilane, 3-chloropropyltrimethyoxysilane, trimethoxysilyl ethyl amine, triethoxysilyl ethyl amine, tripropoxysilyl ethyl amine, tributoxysilyl ethyl amine, trimethoxysilyl propyl amine, triethoxysilyl propyl amine, tripropoxysilyl propyl amine, triisopropoxysilyl propyl amine, tributoxysilyl propyl amine, trimethoxysilyl butyl amine, triethoxysilyl butyl amine, tripropoxysilyl butyl amine, tributoxysilyl butyl amine, trimethoxysilyl pentyl amine, triethoxysilyl pentyl amine, tripropoxysilyl pentyl amine, tributoxysilyl pentyl amine, trimethoxysilyl hexyl amine, triethoxysilyl hexyl amine, tripropoxysilyl hexyl amine, tributoxysilyl hexyl amine, trimethoxysilyl heptyl amine, triethoxysilyl heptyl amine, tripropoxysilyl heptyl amine, tributoxysilyl heptyl amine, trimethoxysilyl octyl amine, triethoxysilyl octyl amine, tripropoxysilyl octyl amine, tributoxysilyl octyl amine, and mixtures thereof.

The method of Embodiment B or Embodiment B with any of the intervening features wherein the coupling agent comprises maleic anhydride grafted polypropylene and is about 0.1% to about 5.0% by weight of the automotive acoustic panel.

The method of Embodiment B or Embodiment B with any of the intervening features further comprising: providing a coloring agent, a flame retardant, a UV light stabilizer, or combinations thereof to the porous sound-absorption material.

Embodiment C is a method of forming an automotive acoustic panel, the method comprising: providing an expanded perlite treated with one or more silane compounds and a coupling agent; providing a polymer having a chemical foaming agent; combining the polymer and the expanded perlite to form a porous sound-absorption material; pressing the porous sound-absorption material using a double belt press to form a perlite composite sheet; and thermoforming the perlite composite sheet to form the automotive acoustic panel.

The method of Embodiment C wherein the thermoforming uses a vacuum mold and/or a mechanical mold.

The method of Embodiment C or Embodiment C with any of the intervening features wherein the coupling agent comprises maleic anhydride grafted polypropylene and the coupling agent is about 0.1% to about 5.0% by weight of the automotive acoustic panel.

What is claimed is:

1. A method of forming an acoustic panel, the method comprising:
   providing an expanded perlite treated with one or more silane compounds;
   providing a polymer, wherein the polymer comprises a chemical foaming agent at a concentration of about 6.0% by weight of the acoustic panel to about 20% by weight of the acoustic panel;
   combining the polymer and the expanded perlite to form a porous sound-absorption material;
   pressing the porous sound-absorption material using a double belt press to form a perlite composite sheet; and
   thermoforming the perlite composite sheet using at least one of a vacuum and mechanical mold to form the acoustic panel.

2. The method of claim 1, further comprising:
   contacting a coupling agent to the expanded perlite treated with the one or more silane compounds.

3. The method of claim 1, wherein the polymer is selected from polyethylene-co-propylene, polyethylene, polypropylene, polyester, polyamide, PVC, nylons, polystyrene, polyphenylene sulfide, polyoxymethylene and polycarbonate, and combinations thereof.

4. The method of claim 1, wherein the expanded perlite has a density from about 0.25 g/cm$^3$ to about 0.40 g/cm$^3$ and the expanded perlite has a diameter of less than about 0.1 mm.

5. The method of claim 1, wherein the one or more silane compounds is selected from polydimethyl siloxane, polymethylphenyl siloxane, di-hydroxy terminated polydimethyl siloxanes, dialkoxy terminated polydimethyl siloxanes, N-(2-aminoethyl)-3-aminopropyltrimethoxysilane, 3-methacryloxypropyltrimethoxysilane, 3-glycidoxypropyltrimethoxysilane, 3-chloropropyltrimethoxysilane, trimethoxysilyl ethyl amine, triethoxysilyl ethyl amine, tripropoxysilyl ethyl amine, tributoxysilyl ethyl amine, trimethoxysilyl propyl amine, triethoxysilyl propyl amine, tripropoxysilyl propyl amine, triisopropoxysilyl propyl amine, tributoxysilyl propyl amine, trimethoxysilyl butyl amine, triethoxysilyl butyl amine, tripropoxysilyl butyl amine, tributoxysilyl butyl amine, trimethoxysilyl pentyl amine, triethoxysilyl pentyl amine, tripropoxysilyl pentyl amine, tributoxysilyl pentyl amine, trimethoxysilyl hexyl amine, triethoxysilyl hexyl amine, tripropoxysilyl hexyl amine, tributoxysilyl hexyl amine, trimethoxysilyl heptyl amine, triethoxysilyl heptyl amine, tripropoxysilyl heptyl amine, tributoxysilyl heptyl amine, trimethoxysilyl octyl amine, triethoxysilyl octyl amine, tripropoxysilyl octyl amine, tributoxysilyl octyl amine, and mixtures thereof.

6. The method of claim 2, wherein the coupling agent is present at a concentration of about 1.0% to about 5.0% by weight of the acoustic panel.

7. The method of claim 1, the method further comprising: providing a coloring agent, a flame retardant, a UV light stabilizer, or combinations thereof to the porous sound-absorption material.

8. The method of claim 1, wherein the chemical foaming agent is present at a concentration of about 6.0% to about 8.0% by weight of the acoustic panel.

9. The method of claim 8, wherein the chemical foaming agent is selected from sodium carbonate; sodium hydrogen carbonate, magnesium carbonate, magnesium hydrogen carbonate, calcium carbonate, calcium hydrogen carbonate, aluminum carbonate, aluminum hydrogen carbonate, iron carbonate, iron hydrogen carbonate, ammonium carbonate, ammonium hydrogen carbonate, ammonium carbamate, and combinations thereof.

10. The method of claim 1, wherein the polymer is a base polymer and comprises at least 80% by weight of the acoustic panel.

11. A method of forming an automotive acoustic panel, the method comprising:
providing an expanded perlite treated with one or more silane compounds and a coupling agent, wherein the coupling agent is present at a concentration of about 1.0% to about 5.0% by weight of the acoustic panel;
providing a polymer, wherein the polymer comprises a chemical foaming agent at a concentration of about 6.0% by weight of the acoustic panel to about 20% by weight of the acoustic panel;
combining the polymer and the expanded perlite to form a porous sound-absorption material;
pressing the porous sound-absorption material using a double belt press to form a perlite composite sheet; and
thermoforming the perlite composite sheet to form the automotive acoustic panel.

12. The method of claim 11, wherein the thermoforming includes using a vacuum mold.

13. The method of claim 11; wherein the thermoforming includes using a mechanical mold.

14. The method of claim 11, wherein the coupling agent comprises maleic anhydride grafted polypropylene.

15. The method of claim 11, wherein the polymer comprises a chemical foaming agent.

16. A method of forming an automotive acoustic panel, the method comprising:
providing an expanded perlite treated with one or more silane compounds and a coupling agent; wherein the coupling agent is about 1.0% to about 5.0% by weight of the automotive acoustic panel;
providing a base polymer comprising at least 80% by weight of the automotive acoustic panel;
combining the base polymer and the expanded perlite to form a porous sound-absorption material;
pressing the porous sound-absorption material using a double belt press to form a perlite composite sheet; and
thermoforming the perlite composite sheet to form the automotive acoustic panel using at least one of a vacuum and mechanical mold.

17. The method of claim 16, wherein the base polymer is selected from polyethylene-co-propylene, polyethylene, polypropylene, polyester, polyamide, PVC, nylons, polystyrene, polyphenylene sulfide, polyoxymethylene and polycarbonate, and combinations thereof.

18. The method of claim 16; wherein the expanded perlite has a density from about 0.25 g/cm$^3$ to about 0.40 g/cm$^3$ and the expanded perlite has a diameter of less than about 0.1 mm.

19. The method of claim 16, wherein the coupling agent comprises maleic anhydride grafted polypropylene.

20. The method of claim 16, wherein the base polymer further comprises a chemical foaming agent at a concentration of about 6.0% by weight of the acoustic panel to about 20% by weight of the acoustic panel.

* * * * *